(12) United States Patent
Lowell et al.

(10) Patent No.: US 10,988,554 B2
(45) Date of Patent: *Apr. 27, 2021

(54) ELIMINATION OF POLYMER FOULING IN FLUIDIZED BED GAS-PHASE FINES RECOVERY EDUCTORS

(71) Applicant: CHEVRON PHILLIPS CHEMICAL COMPANY LP, The Woodlands, TX (US)

(72) Inventors: Jeffrey S. Lowell, Huffman, TX (US); Gregory G. Hendrickson, Kingwood, TX (US); Ralph J. Price, Porter, TX (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/522,088

(22) Filed: Jul. 25, 2019

(65) Prior Publication Data
US 2019/0382512 A1 Dec. 19, 2019

Related U.S. Application Data

(63) Continuation of application No. 15/730,314, filed on Oct. 11, 2017, now Pat. No. 10,457,753.

(60) Provisional application No. 62/408,421, filed on Oct. 14, 2016.

(51) Int. Cl.
| | | |
|---|---|---|
| *C08F 2/01* | (2006.01) | |
| *C08F 6/00* | (2006.01) | |
| *B01J 4/00* | (2006.01) | |
| *B01J 8/18* | (2006.01) | |
| *B01D 49/00* | (2006.01) | |
| *B01J 8/00* | (2006.01) | |

(Continued)

(52) U.S. Cl.
CPC .............. *C08F 2/01* (2013.01); *B01D 49/00* (2013.01); *B01J 4/002* (2013.01); *B01J 8/004* (2013.01); *B01J 8/0055* (2013.01); *B01J 8/1854* (2013.01); *B01J 8/1863* (2013.01); *B01J 19/26* (2013.01); *C08F 6/001* (2013.01); *C08F 6/005* (2013.01); *C08F 2/34* (2013.01); *Y02P 20/582* (2015.11)

(58) Field of Classification Search
USPC ........... 366/163.2; 110/207; 422/145; 526/68
See application file for complete search history.

(56) References Cited

U.S. PATENT DOCUMENTS

| | | |
|---|---|---|
| 4,640,963 A | 2/1987 | Kreider et al. |
| 4,882,400 A | 11/1989 | Dumain et al. |
| 5,026,795 A | 6/1991 | Hogan |

(Continued)

FOREIGN PATENT DOCUMENTS

WO 1997014721 A1 4/1997

OTHER PUBLICATIONS

IUPAC Compendium of Chemical Terminology, 2nd Ed. 1997, pp. 1-1670.

*Primary Examiner* — Fred M Teskin
(74) *Attorney, Agent, or Firm* — Eversheds Sutherland (US) LLP

(57) ABSTRACT

An eductor, a process and apparatus for gas phase polymerization of olefins in a polymerization reactor are disclosed. The process and apparatus employ an eductor which has an inlet which makes a bend of less than about 90° toward the outlet after entering the mixing chamber of the eductor.

20 Claims, 5 Drawing Sheets
(2 of 5 Drawing Sheet(s) Filed in Color)

(51) Int. Cl.
*B01J 19/26* (2006.01)
*C08F 2/34* (2006.01)

(56) References Cited

U.S. PATENT DOCUMENTS

| | | |
|---|---|---|
| 5,028,670 A | 7/1991 | Chinh |
| 6,586,539 B2 | 7/2003 | Cassisa |
| 7,332,070 B2 | 2/2008 | Nishida |
| 7,718,139 B2 | 5/2010 | Scott et al. |
| 7,977,436 B2 | 7/2011 | Scott et al. |
| 8,198,384 B1 | 6/2012 | Moore et al. |
| 10,457,753 B2 * | 10/2019 | Lowell .................. B01D 49/00 |
| 2007/0297954 A1 | 12/2007 | Santilli |
| 2008/0045675 A1 * | 2/2008 | Larson .................... C08F 10/00 526/65 |
| 2009/0261486 A1 | 10/2009 | Olivier |
| 2012/0291738 A1 | 11/2012 | Hobart |
| 2015/0284481 A1 | 10/2015 | Cai |
| 2018/0105613 A1 | 4/2018 | Lowell |

\* cited by examiner

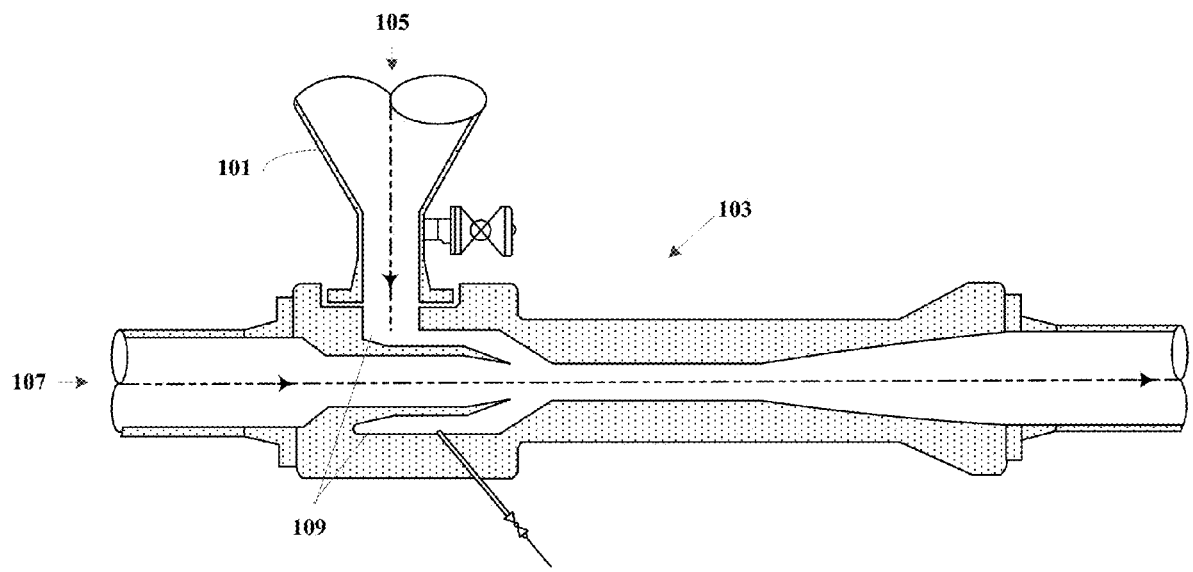
FIG. 1- PRIOR ART
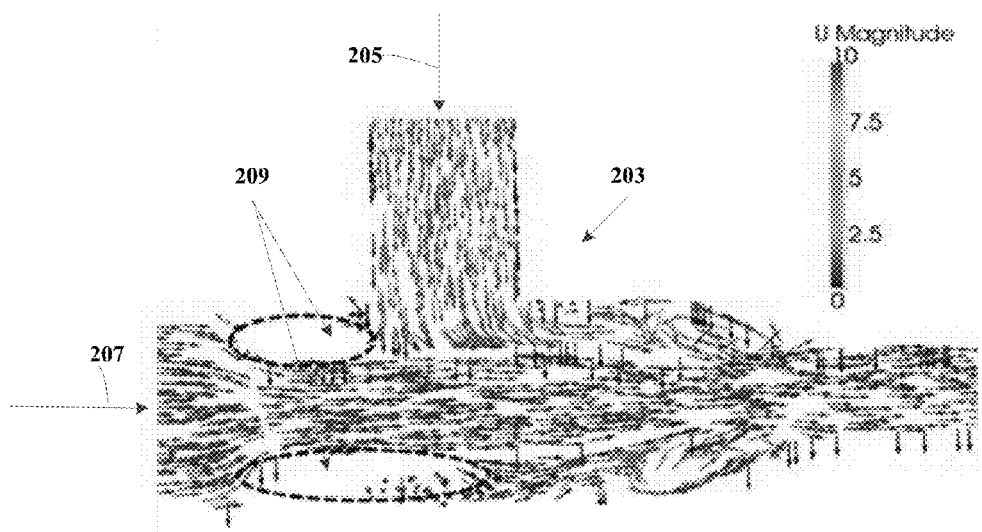
FIG. 2

ELIMINATION OF POLYMER FOULING IN FLUIDIZED BED GAS-PHASE FINES RECOVERY EDUCTORS

CROSS-REFERENCE TO RELATED APPLICATIONS

This application is a continuation of U.S. application Ser. No. 15/730,314, entitled "Elimination of Polymer Fouling in Fluidized Bed Gas-Phase Fines Recovery Eductors," filed on Oct. 11, 2017, which claims the benefit of priority to U.S. Provisional Application No. 62/408,421, entitled "Elimination of Polymerization Fouling in Fluidized Bed Gas-Phase Fines Recovery Eductors," filed on Oct. 14, 2016, the entirety of each of which is hereby incorporated herein by reference.

FIELD OF THE DISCLOSURE

This disclosure relates generally to eductors and their design, and methods and apparatuses for using the same.

BACKGROUND

Gas phase polymerization processes typically produce a gaseous stream exiting the gas phase reactor that contains fine solid particles, unreacted olefins, and other gaseous and particulate components. These fine solid particles are often referred to as polymer fines, and they include growing polymer particles, formed and agglomerated polymer particles, and catalyst or pre-polymer particles. In gas phase, fluidized bed polymerization processes, it is desirable to separate these solid fines from the exit gases and return them to the gas-phase reactor for further reaction.

Eductors are frequently used in the separation and return of the solid fines to the reactor. In commercial polymerization processes, for example continuous gas-phase, fluidized bed polyolefin polymerization processes, eductors may be used in combination with fines separators such as cyclones in this process. For example, the solid fines particles can be removed from the bottom of the cyclone by the suction provided by an ejector and recycled to the reactor. However, with typical eductor designs, it is common that the gas loop piping and equipment will foul with polymer build up in low-flow zones. Build-up may arise from the deposition of formed polymer particles or growing polymer particles that may continue polymerization of available olefins. The extent of this problem may be sufficiently severe that a shutdown is periodically required for cleaning, in some instances as often as every few months. Such incidents are costly from both time and economic standpoints. Eductors can provide the motive force necessary to transfer the stream comprising fine particles back into the reactor.

Various solutions to the problem of eductor fouling have been proposed. For example, the eductor may periodically be flushed with a nitrogen purge or a continuous motive gas purge, whereby the cyclone and eductor are purged with a stream of high pressure gas, to remove any collected fines and prevent further eductor fouling. However, eductor purges cause down time in the reactor and eductor operations, resulting in extremely high operating and maintenance costs. Various eductor designs have also been explored in an attempt to address this issue and improve metrics such as reactor run time from a mechanical solution standpoint.

Therefore, there is an ongoing need for improved eductor designs which might reduce the incidence of polymer fouling. There is also a need for new eductor designs which do not require frequent high pressure nitrogen or liquid purges, and which may thereby increase efficiency and profitability of the reactor systems with which they are associated.

SUMMARY

According to the present disclosure, an eductor is provided having a structure that improves the operation and efficiency of the eductor, and which addresses the polymer fouling problem. Therefore, this disclosure provides an eductor comprising:
  a first tubular body having a hollow interior and comprising
    a first inlet and a first outlet spaced apart from the first inlet along a central axis, and
    a sidewall circumscribing the central axis and defining a mixing chamber;
  a second tubular body having a hollow interior and comprising a second inlet and a spaced apart second outlet which extends into the mixing chamber through the sidewall of the first tubular body between the first inlet and the first outlet; and
  wherein the second inlet is oriented substantially perpendicular to the axis of the first tubular body;
  wherein the second tubular body comprises a first bend of less than 90° from perpendicular toward the first outlet before extending into the mixing chamber; and
  wherein the second tubular body comprises a second bend of less than 90° toward the first outlet after extending into the mixing chamber.

As an example, the second tubular body can make a first bend of about 45° from perpendicular toward the first outlet before entering the mixing chamber and make a second bend of about 45° toward the first outlet after entering the mixing chamber.

In accordance with a further aspect, this disclosure provides an eductor comprising:
  a first tubular body having a hollow interior and comprising
    a first inlet and a first outlet spaced apart from the first inlet along a central axis, and
    a sidewall circumscribing the central axis and defining a mixing chamber; and
  a second tubular body having a hollow interior and comprising a second inlet and a spaced apart second outlet which extends into the mixing chamber through the sidewall of the first tubular body between the first inlet and the first outlet;
  wherein the second tubular body comprises a bend of less than 90° toward the first outlet after extending into the mixing chamber.

In still a further aspect, this disclosure provides an eductor comprising:
  a first tubular body having a hollow interior and comprising
    a first inlet and a first outlet spaced apart from the first inlet along a central axis, and
    a sidewall circumscribing the central axis and defining a mixing chamber; and
  a second tubular body having a hollow interior and comprising a second inlet and a spaced apart second outlet which extends into the mixing chamber through the sidewall of the first tubular body between the first inlet and the first outlet;

wherein the second inlet is oriented at an angle less than perpendicular to the axis of the first tubular body toward the first outlet before extending into the mixing chamber; and wherein the second tubular body comprises a bend at an angle less than perpendicular toward the first outlet after extending into the mixing chamber.

Yet a further aspect of this disclosure provides a method of motivating a gas stream containing solid fines, the method comprising the steps of introducing a gas stream comprising solid fines and a gas stream comprising a motive gas into any of the eductors disclosed herein, such as those described in the paragraphs above.

Further, this disclosure sets out an apparatus for polymerizing olefins, comprising:

a polymerization reactor for contacting one or more olefins with a catalyst under polymerization conditions to form a gas stream comprising solid fines and unreacted olefins;

a fines separator in fluid communication with the polymerization reactor for separating the solid fines from the unreacted olefins; and an eductor in fluid communication with the fines separator for conveying the solid fines back to the polymerization reactor, wherein the eductor is any eductor disclosed herein, such as one of the eductors described in the paragraphs above.

This disclosure also sets out a process for polymerizing olefins comprising:

contacting one or more olefins with a catalyst in a polymerization reactor under polymerization conditions to form a gas stream comprising fine polymer particles and unreacted olefins;

passing the gas stream to a fines separator to separate the fine polymer particles from the unreacted olefins;

passing the fine polymer particles from the fines separator to any of the eductors disclosed herein, such as one of the eductors described in the paragraphs above; and introducing a motive gas into the eductor to convey the fine polymer particles back to the polymerization reactor.

These and various other aspects and embodiments of this disclosure are illustrated in the drawings, examples, and detailed description that follow.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following figures form part of the present specification and are included to further demonstrate certain aspects of the present disclosure. The invention may be better understood by reference to one or more of these figures in combination with the detailed description of specific aspects presented herein.

FIG. 1 illustrates an exemplary schematic diagram of a gas phase eductor that includes various conventional design elements.

FIG. 2 illustrates an exemplary schematic diagram illustrating the computational fluid dynamics model of the eductor of FIG. 1, where the color of the arrows indicates the velocity magnitude of the flow according to the color scale illustrated in the figure (u is velocity magnitude).

Figure 3:
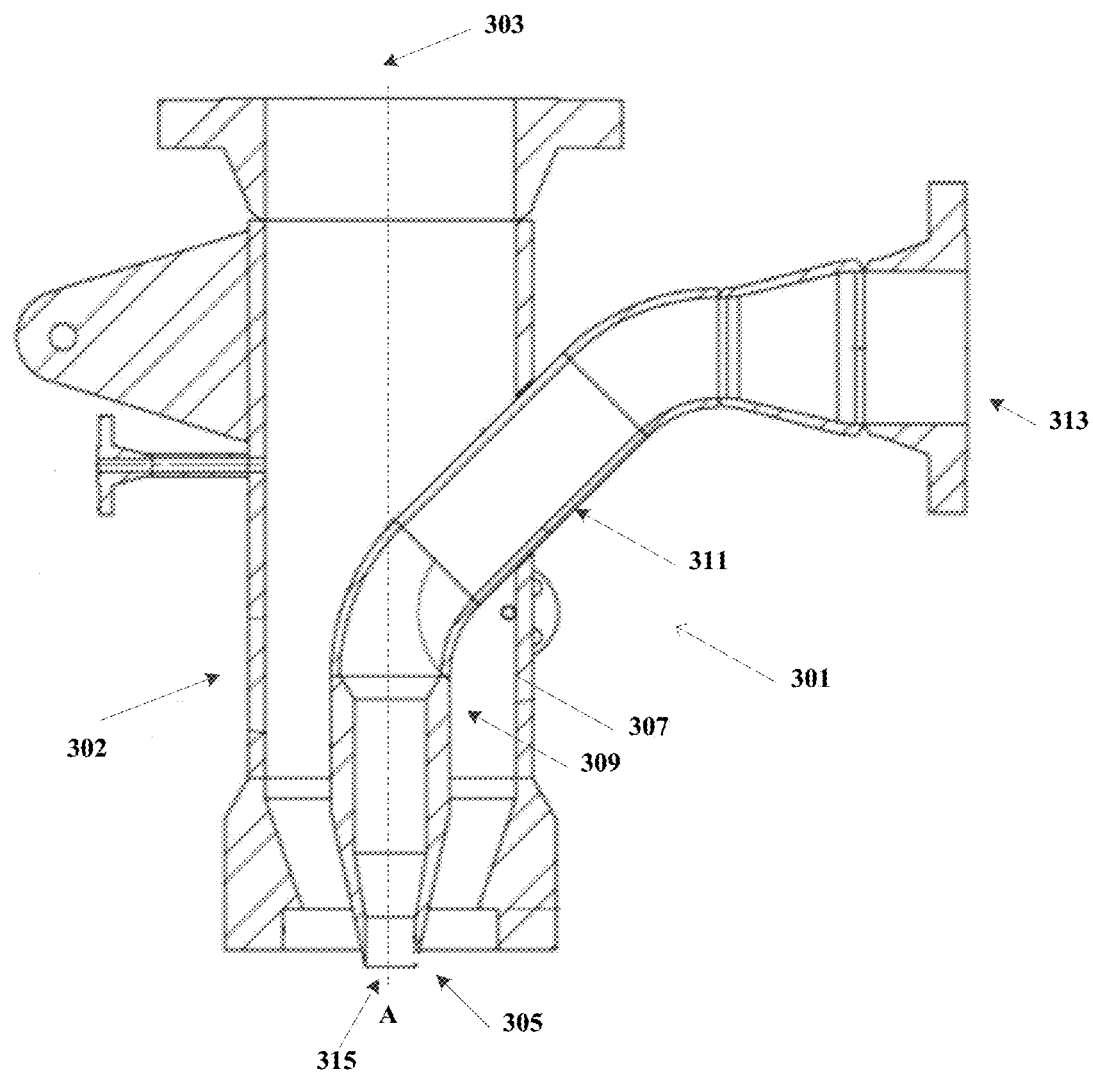
FIG. 3 illustrates an exemplary schematic diagram of an eductor according to an aspect of the present disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

Definitions

The following definitions are provided in order to aid those skilled in the art in understanding the detailed description of the present invention. Unless otherwise defined herein, scientific and technical terms used in connection with the present invention shall have the meanings that are commonly understood by those of ordinary skill in the art to which this invention belongs, and unless otherwise indicated or the context requires otherwise, these definitions are applicable throughout this disclosure. Further, unless otherwise required by context, singular terms shall include pluralities and plural terms shall include the singular.

If a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Unless explicitly stated otherwise in defined circumstances, all percentages, parts, ratios, and like amounts used herein are defined by weight.

Further, in this connection, certain features of the invention which are, for clarity, described herein in the context of separate embodiments, may also be provided in combination in a single embodiment. Conversely, various features of the invention that are, for brevity, described in the context of a single embodiment, may also be provided separately or in any sub-combination.

Regarding claim transitional terms or phrases, the transitional term "comprising", which is synonymous with "including", "containing", or "characterized by" is inclusive or open-ended and does not exclude additional, un-recited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Absent an indication to the contrary, when describing a compound or composition "consisting essentially of" is not to be construed as "comprising," but is intended to describe the recited component that includes materials which do not significantly alter composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of, apply only to feature class to which is utilized and it is possible to have different transitional terms or phrases utilized with different features within a claim. For example, a method can comprise several recited steps (and other non-recited steps) but utilize a catalyst system preparation consisting of specific steps and utilize a catalyst system comprising recited components and other non-recited components. While compositions and methods are described in terms of "comprising" various components or steps, the compositions and methods can also "consist essentially of" or "consist of" the various components or steps.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

"Optional" or "optionally" means that the subsequently described event or circumstance can or cannot occur, and that the description includes instances where the event or circumstance occurs and instances where it does not.

The terms "configured for use" or "adapted for use" and similar language is used herein to reflect that the particular recited structure or procedure is used in an olefin polymerization system or process as disclosed herein. For example, unless otherwise specified, a particular structure "configured for use" means it is "configured for use in an olefin polymerization reactor system" and therefore is designed, shaped, arranged, constructed, and/or tailored to effect an olefin polymerization, as would have been understood by the skilled person.

Terms such as "eductor", "ejector", "eductor pump", "ejector pump", "aspirator" and similar terms are used interchangeably to refer to devices that use the Venturi effect of a converging nozzle to convert the pressure energy of a motive fluid, in this case a motive gas, to create a low pressure zone to suction and entrain another fluid. Typical eductors use a converging (inlet) nozzle and diverging (outlet) diffuser ("converging-diverging nozzle") and the pressure energy of a motive fluid, typically a motive gas, to create a low pressure zone to suction and entrain another fluid. As used herein, a "motive gas" is a gas which is used to entrain polymer fines by imparting suction to the eductor by creating a low pressure area at the discharge of a nozzle and/or downstream of a constricted area. The reduction in fluid pressure results when a fluid flows through a section of a pipe that first narrows or constricts to a smaller cross section and then enlarges to a larger cross section. The term "converging-diverging nozzle" refers to the portion of the eductor that includes the converging (inlet) nozzle and diverging (outlet) diffuser. Other portions of the eductor relate to how the motive fluid and the other fluid to be entrained enter and/or are mixed in the eductor.

The term "fines", "solid fines", "polymer fines", "solid polymer fines" and the like are used interchangeably herein to refer to solid particles which have an average particle size of less than the median particle size of the solid particles in the relevant gaseous stream comprising such particles. In one aspect, solid fines can have an aerodynamic diameter of about or less than 2.5 µm (microns) (also referred to as $PM_{2.5}$), 5 microns, 10 microns, 20 microns, 50 microns, 75 microns, or 200 mesh. Even though the term "polymer" may be associated with the term "fines", this term is intended to encompass any solid particle in the subject gaseous stream, including catalyst or pre-polymer particles that may be charged to the reactor, growing polymer particles, agglomerated polymer particles, and the flakes or spalling of polymer particles. In some embodiments, the polymer particle size in the process can include but is not limited to the following sizes; Group A, 30 to 100 microns; Group B, 100 to 1,000 microns; Group C, 0 to 30 microns. The polymer should not be construed to be limited to any particular particle size distribution.

The term "olefin" is used herein in accordance with the definition specified by IUPAC: acyclic and cyclic hydrocarbons having one or more carbon-carbon double bonds apart from the formal ones in aromatic compounds. The class "olefins" subsumes alkenes and cycloalkenes and the corresponding polyenes. Ethylene, propylene, 1-butene, 2-butene, 1-hexene and the like are non-limiting examples of olefins. The term "alpha olefin" (α-olefin) refers to an olefin that has a double bond between the first and second carbon atom of the longest contiguous chain of carbon atoms. The term "alpha olefin" includes linear and branched alpha olefins unless expressly stated otherwise.

When describing a range of measurements such as angles and the like, it is the Applicant's intent to disclose every individual number that such a range could reasonably encompass, for example, every individual number that has at least one more significant figure than in the disclosed end points of the range. As an example, when referring to an angle of the first or the second bend as between 40° and 50°, it is intended to disclose that the angle can be 40°, 41°, 42°, 43°, 44°, 45°, 46°, 47°, 48°, 49°, or 50°, including any subranges or combinations of subranges encompassed in this broader range. Applicant's intent is that these two methods of describing the range are interchangeable. Moreover, when a range of values is disclosed or claimed, Applicant also intends for the disclosure of a range to reflect, and be interchangeable with, disclosing any and all sub-ranges and combinations of sub-ranges encompassed therein. Accordingly, Applicant reserves the right to proviso out or exclude any individual members of any such group, including any sub-ranges or combinations of sub-ranges within the group, or any selection, feature, range, element, or aspect that can be claimed, if for any reason Applicant chooses to claim less than the full measure of the disclosure, for example, to account for a reference that Applicant may be unaware of at the time of the filing of the application. In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about", the claims include equivalents to the quantities. The term "about" may mean within 10% of the reported numerical value, or within 5% of the reported numerical value, or within 2% of the reported numerical value.

As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but may include other elements not expressly listed or inherent to such composition, mixture, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term "contacting", as used herein, refers to the process of bringing into contact at least two distinct species such that they can react. It will be appreciated, however, that the resulting reaction product can be produced directly from a reaction between the added reagents or from an intermediate from one or more of the added reagents which can be produced in the reaction mixture.

The terms "substantial" and "substantially", as used herein, are broad terms, are meant to be given their ordinary and customary meaning to a person of ordinary skill in the art (and are not to be limited to a special or customized meaning), including, without limitation, referring to an amount about 90 degrees from perpendicular, about 85 degrees from perpendicular, or about 75 degrees from perpendicular, referring to an amount 0 degrees from parallel, 5 degrees from parallel, or 15 degrees from parallel.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Among other things, this disclosure provides an eductor having an improved operation and efficiency, which reduces the polymer fouling problem that is typically associated with conventional eductors. Eductors are frequently used to entrain fine solids in a stream of fluid, for example, in a polymerization reactor apparatus and process where they entrain fine solids in a stream of fluid for recycling back to the polymerization reactor. In some aspects, eductors may be coupled to the solids outlet of a cyclone separator located downstream of a polymerization reactor, wherein the cyclone is used to separate polymer fines from a gas. In the eductors disclosed herein, the eductors may be used to entrain the separated polymer fines in a stream of motive gas, which may comprise unreacted olefins and other hydrocarbons. One aspect involves return of the separated polymer fines and/or the unreacted olefins to the gas-phase polymerization reactor.

According to an aspect, this disclosure provides an eductor comprising: a first tubular body having a hollow interior and comprising a first inlet and a first outlet spaced apart from the first inlet along a central axis, and a sidewall circumscribing the central axis and defining a mixing chamber; and a second tubular body having a hollow interior and comprising a second inlet and a spaced apart second outlet which extends into the mixing chamber through the sidewall of the first tubular body between the first inlet and the first outlet; and wherein the second tubular body comprises a bend of less than 90° toward the first outlet after extending into the mixing chamber.

In some aspects and embodiments of this eductor: [1] the second inlet can be oriented at an angle less than perpendicular to the axis of the first tubular body toward the first outlet before extending into the mixing chamber, and the second tubular body comprises a bend at an angle less than perpendicular toward the first outlet after extending into the mixing chamber; or [2] the second inlet can be oriented substantially perpendicular to the axis of the first tubular body, wherein the second tubular body comprises a first bend of less than 90° from perpendicular toward the first outlet before extending into the mixing chamber, and wherein the second tubular body comprises a second bend of less than 90° toward the first outlet after extending into the mixing chamber.

In a further aspect, this disclosure provides an eductor wherein the second tubular body can include a first bend of less than 90° from perpendicular toward the first outlet before extending into the mixing chamber. In this aspect, the first bend can be about 5°, about 10°, about 15°, about 20°, about 25°, about 30°, about 35°, about 40°, about 45°, about 50°, about 55°, about 60°, about 65°, about 70°, about 75°, about 80°, about 85°, or less than 90°, from perpendicular toward the first outlet before extending into the mixing chamber, including any ranges between the angles. In yet another aspect, the second tubular body can include a second bend of less than 90° toward, or in the direction of, the first outlet after extending into the mixing chamber. In this aspect, the second bend can be about 5°, about 10°, about 15°, about 20°, about 25°, about 30°, about 35°, about 40°, about 45°, about 50°, about 55°, about 60°, about 65°, about 70°, about 75°, about 80°, about 85°, or less than 90° toward the first outlet after extending into the mixing chamber, including any ranges between the angles. As an example, the first or the second bend as disclosed herein can be between about 30° and about 60°, between about 35° and about 55°, or between about 40° and about 50°.

Many conventional eductors are prone to fouling, whereby solid fines collect in the mixing chamber of the eductor and, over time, partially or completely clog and block (partially or fully) the passage of fines through the eductor. For example, FIG. 1 depicts a schematic diagram of a typical gas phase eductor (equivalently referred to as an ejector) that includes various conventional design elements. As shown in this figure, cyclones 101 are coupled to eductor 103. As would be understood by one skilled in the art, fines separated from the cyclones 101 flow downward as shown by arrow 105 into the eductor, wherein they are forced to make a 90° turn, and a motive gas flows straight from left to right (as oriented in FIG. 1) into the eductor as shown by arrow 107. However, operation of these eductors in gas-phase polymerization rectors has revealed areas which are prone to fouling or plugging with fines, shown as areas 109. Moreover, the fouling of these eductors often results in significant problems with other connected equipment, for example with downstream heat exchangers, compressors, and even with reactors which may experience fouling, clogging, and/or reduced efficiency.

This fouling or plugging is further illustrated by reference to FIG. 2, which depicts a computational fluid dynamics (CFD) simulation model of the eductor of FIG. 1. FIG. 2 depicts a stream of fines from a cyclone 205 which are introduced through the top of the eductor 203 (as shown in this figure) and a stream of motive gas 207 which is introduced through the left side of the eductor 203 (as oriented in FIG. 2). Arrows within the eductor 203 indicate the direction of flow, while the color of the arrows indicates the velocity of the flow, according to the color scale illustrated in the figure. As can be seen by reference to this figure, the design of eductor 203 results in two low flow areas 209, which correspond with the areas which are prone to fouling or plugging with fines, shown as area 109 in FIG. 1. As would be appreciated by the skilled person, fines are likely to collect in these low flow areas, because polymer fines are more likely to separate from a stream of motive gas as the flow rate of that motive gas decreases, resulting over time in eductor fouling and/or clogging, and plant downtime.

FIG. 3 depicts a schematic diagram of an eductor 301 according to an embodiment of the present disclosure. In this embodiment, the eductor 301 has a first tubular body 302 having a hollow interior, which has a first inlet 303, and a first outlet 305 spaced apart from the first inlet 303, both of which are along a central axis A. The eductor 301 further has a sidewall 307 circumscribing the central axis A and defining a mixing chamber 309 within. Additionally, the eductor 301 has a second tubular body 311, which has a second inlet 313 and a second outlet 315 spaced apart from the second inlet 313. As can be seen in FIG. 3, the second tubular body 311 extends into the mixing chamber 309 through the sidewall 307 of the first tubular body 302. In the embodiment illustrated in FIG. 3, the second tubular body 311 has two separate 45° bends, a first bend which occurs outside the first tubular body 302 between the second inlet 313 and the second outlet 315, prior to the tubular body 302 entering and passing through sidewall 307 into the mixing chamber 309, and a second turn which occurs inside the mixing chamber 309 between the second inlet 313 and the second outlet 315. More specifically, in the embodiment illustrated in FIG. 3, the second tubular body 311 has a second turn which occurs inside the mixing chamber 309 between the second inlet 313 and the second outlet 315, such that the second outlet 315 is coaxial with the central axis A. In some embodiments of this eductor design, the second inlet 313 can be oriented at an angle less than perpendicular to the axis of the first tubular body 302 toward the first outlet 305 before extending into the mixing chamber, and the second tubular body comprises a bend at an angle less than perpendicular toward the first outlet after extending into the mixing chamber.

In some embodiments, the second inlet 313 may be oriented substantially perpendicular to the central axis A of the first tubular body 302. In some embodiments, the second tubular body 311 may have a first bend of less than about 90° from perpendicular toward the first outlet 305 before extending into the mixing chamber 309 between the second inlet 313 and the second outlet 315 and may also have a second bend of less than about 90° toward the first outlet 305 after extending into the mixing chamber 309 between the second inlet 313 and the second outlet 315. In some embodiments, the first inlet 303 is in fluid communication with the fines outlet of a cyclone separator, such that a stream of fines passes through the first inlet 303, and a stream of a motive gas passes through the second inlet 313. In accordance with some other embodiments of the disclosure, the second inlet 313 is in fluid communication with the fines outlet of a cyclone separator, such that a stream of fines passes through the second inlet 313, and a stream of a motive gas passes through the first inlet 303. While illustrated such that the central axis A is substantially vertical, in some embodiments of the present disclosure, the eductor may be used in other configurations. For example, in some embodiments of the present disclosure, the eductor 301 can be configured such that the central axis A can be substantially horizontal, or can be at any angle between about 0° and about 90° from horizontal, for example and without limitation, about 15° from horizontal, about 30° from horizontal, about 45° from horizontal, about 60° from horizontal, about 75° from horizontal, or about 90° from horizontal.

In some embodiments of the present disclosure, the second tubular body 311 may be substantially parallel to the central axis A at the second outlet 315. In some embodiments of the present disclosure, the second tubular body 311 may be coaxial with the first tubular body 302 about the central axis A at the second outlet 315. However, in some embodiments of the present disclosure, the second tubular body 311 may not be coaxial with the first tubular body 302 about the central axis A at the second outlet 315. In some embodiments of the present disclosure, the first tubular body 302 is at least partially cylindrical in shape. As used herein, "at least partially cylindrical in shape" is used to refer to a body which is cylindrical in shape along at least a portion of its length. For example, in some embodiments, the first tubular body 302 is at least partially cylindrical in shape if one or more of the first inlet 303 and the first outlet 305 are cylindrical in shape. In some embodiments of the present disclosure, the first tubular body 302 is at least partially conical in shape. As used herein, "at least partially conical in shape" is used to refer to a body which is conical in shape along at least a portion of its length, and includes bodies which do not form complete cones. For example, in some embodiments, the first tubular body 302 is at least partially conical in shape when the first tubular body 302 narrows in internal diameter from the first inlet 303 toward the first 305, forming a partial cone. In some embodiments of the present disclosure, the second tubular body 311 is substantially cylindrical in shape. In some embodiments of the present disclosure, the second tubular body 311 is substantially conical in shape. In other embodiments, either the first tubular body 302 or the second tubular body 311 can be non-cylindrical in shape (e.g., they have a non-circular cross-section), while in further embodiments of the disclosure, both the tubular bodies 302 and 311 can be non-cylindrical in shape.

In some embodiments, the first inlet can be a solid fines inlet and the second inlet can be a motive gas inlet. Alternatively, the first inlet of the eductor can be a motive gas inlet and the second inlet can be a solid fines inlet. In embodiments, the second outlet 315 can further comprise a nozzle in the mixing chamber. Thus, the second outlet can further comprise a nozzle in the mixing chamber regardless of whether the second outlet is a motive gas outlet or a solid fines outlet. Typically, the first inlet of the eductor is a solid fines inlet and the second inlet is a motive gas inlet and the second outlet of the eductor further comprises a nozzle in the mixing chamber.

According to a further aspect, the eductor according to this disclosure can further comprise a converging-diverging nozzle adjacent to the first outlet. In this aspect, the eductor uses a converging (inlet) nozzle and diverging (outlet) diffuser ("converging-diverging nozzle") and the pressure energy of a motive fluid, typically a motive gas, to create a low pressure zone to suction and entrain another fluid. The reduction in fluid pressure results when a fluid flows through a section of a pipe that first narrows or constricts to a smaller cross section and then enlarges to a larger cross section. In some embodiments of the present disclosure, the eductor 301 further includes exit piping downstream of the first outlet which is not substantially parallel with the central axis A of the first tubular body 302. In some embodiments of the present disclosure, the eductor 301 further includes exit piping downstream of the first outlet which is not substantially parallel with the central axis A of the first tubular body 302.

Figure 4:
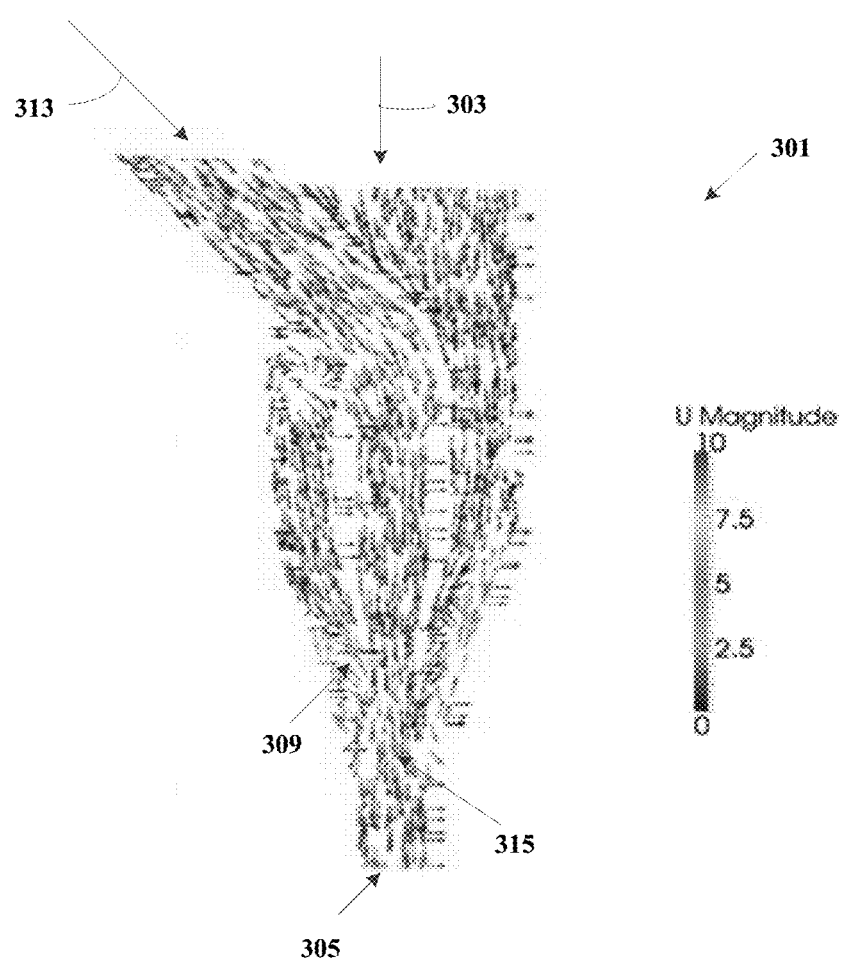
FIG. 4 illustrates an exemplary schematic diagram illustrating the computational fluid dynamics model of the eductor of FIG. 3, where the color and direction of the arrows indicate the velocity magnitude of the flow according to the color scale illustrated in the figure (u is velocity magnitude).

As shown in FIG. 4, and in contrast to the CFD simulation of FIG. 2, the eductor of FIG. 3 does not experience any problematic low flow areas which may lead to the fouling or accumulation of fines. FIG. 4 shows a computational fluid dynamics simulation model of the eductor of FIG. 3, wherein the eductor of FIG. 3 is configured such that a stream of fines is introduced through the first inlet 303 and a motive gas is introduced through the second inlet 313, and is injected into the mixing chamber 309 through a second outlet 315, such that a combined stream of entrained fines in a motive gas exits the eductor through the first outlet 305. In some embodiments of the present disclosure, a stream of fines may be introduced through the first inlet 303 at a rate of about 2,000 lbs/hr. Arrows within the eductor 301 indicate the direction of flow, while the color of the arrows indicates the magnitude or velocity of the flow, according to the color scale illustrated in the figure. As can be seen by reference to the model in this figure, the design of eductor 301 results in now low flow areas, and thus would result in lower, reduced, minimized or no fouling or clogging of the eductor with polymer fines, depending upon the operating conditions of the production system in which the eductor 301 is installed. As would be understood by one of skill in the art, this eductor design will not result in any low flow areas even if the fines stream is introduced through the second inlet 313 and a motive gas is introduced through the first inlet 303.

Figure 5:
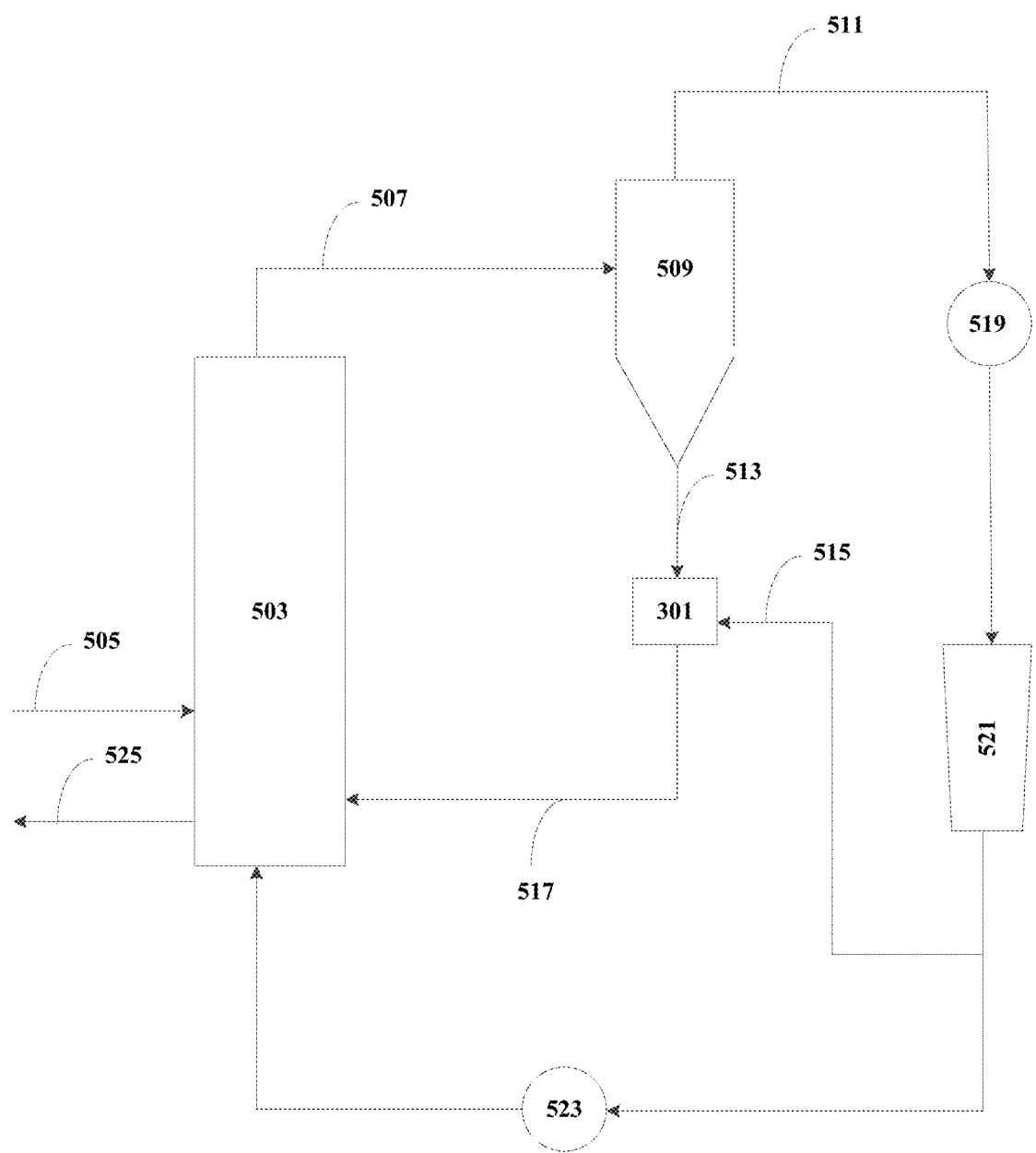
FIG. 5 illustrates an exemplary schematic diagram of a process and apparatus for polymerizing olefins using the eductor of FIG. 3.

FIG. 5 illustrates a schematic diagram of an apparatus and process for polymerizing olefins, employing the eductor of FIG. 3. In this process/apparatus, a stream of olefins 505 is introduced to a polymerization reactor 503. The stream of olefins 505 can include any suitable olefin, combination of olefins, and in some embodiments may include further components such as catalysts, polymerization initiators, chain length controlling agents, and the like, as would be understood the skilled person. The stream of olefins 505 is then at least partially polymerized in the polymerization reactor 503. A stream 507 which includes unreacted olefins and fine polymer solids exits the polymerization reactor 503, and travels to a cyclone 509, where it is separated into a gas stream 511 and a stream of solid fines 513. In some embodiments, the stream of unreacted olefins and fine polymer solids 507 may also contain other components, such as hydrocarbons, catalysts, initiators, and the like, as described herein. The stream of solid fines 513 is then introduced to an eductor 301 along with a stream of a motive gas 515. In embodiments, the inlet of eductor 301 is immediately adjacent the solids outlet at the bottom of the cyclone, but this is not necessary. In some embodiments of FIG. 5, the motive gas 515 can include all or a portion of the gas stream 511. For example, as shown in FIG. 5, the motive gas 515 may consist of the gas stream 511 which has been passed through a first heat exchanger 519 and a compressor 521. Any portion of the gas stream 511 which is not used as motive gas 511 may then be passed through a second heat exchanger 523 and recycled back to the polymerization reactor 503. A stream of entrained solid fines 517 exits the eductor, and is recycled back to the polymerization reactor 503. As shown in FIG. 5, a stream of polymer product 525 exits the polymerization reactor 503.

While eductor 301 is depicted as showing a stream of fines 513 entering through the top of eductor 301 and a stream of entrained solid fines 517 exiting through the bottom of the eductor 301, it should be understood that the eductor 301 may have any suitable configuration, as discussed in reference to FIG. 3. For example, in some embodiments, the eductor 301 may be configured such that the stream of fines 513 enters through the side of eductor 301 and a stream of entrained solid fines 517 exits through the side of the eductor 301, while in some embodiments the eductor 301 may be configured such that the stream of fines 513 enters through the side of eductor 301 and a stream of entrained solid fines 517 exits through the bottom of the eductor 301. In still yet other embodiments, the eductor 301 may be configured such that the stream of fines 513 enters through a side of eductor 301 and a stream of entrained solid fines 517 exits through an opposite side of the eductor 301.

Figure 6:
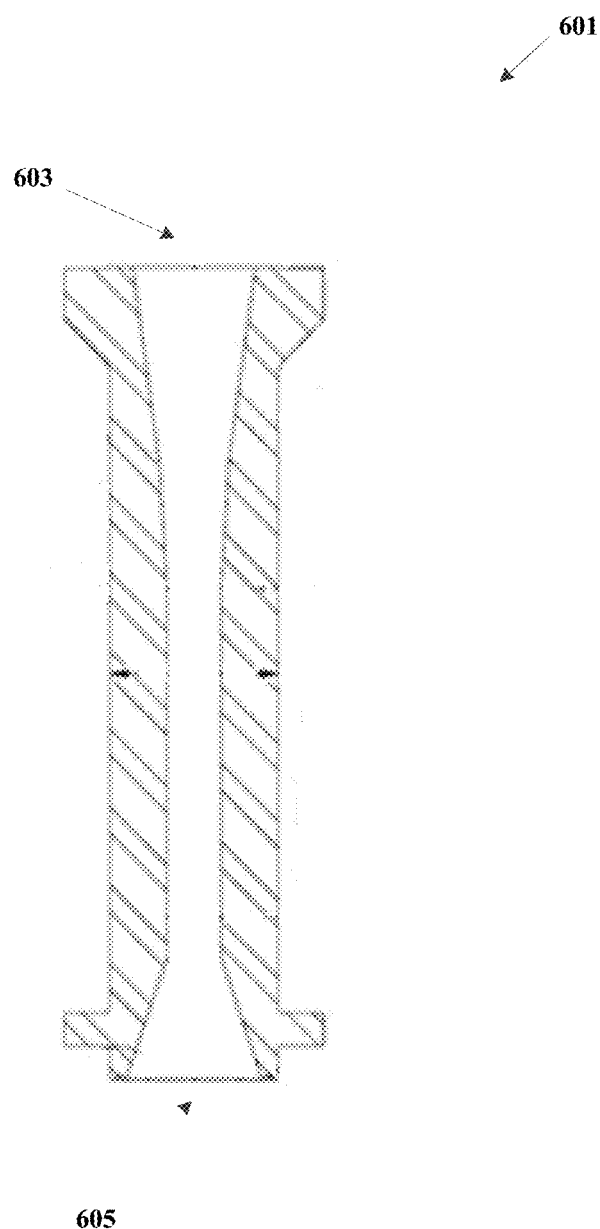
FIG. 6 is one illustration of a converging-diverging nozzle which can be situated adjacent to the first outlet. Such a converging (inlet) nozzle and diverging (outlet) diffuser ("converging-diverging nozzle") uses the pressure energy of a motive gas to create a low pressure zone to suction and entrain another fluid.

FIG. 6 illustrates a converging-diverging nozzle 601 which can be situated adjacent to the first outlet 305 of an eductor 301. The converging-diverging nozzle 601 has a converging inlet nozzle 603 and a diverging outlet diffuser 605. The converging-diverging nozzle 601 thus uses the pressure energy of a motive gas to create a low pressure zone to suction and entrain another fluid. For example, the converging-diverging nozzle 601 may be used to enhance the suction applied to the fines stream, or to suction and entrain another fluid, different from the fluid which was entrained by the eductor 301.

The eductor, process and apparatus of this disclosure are applicable to any gas phase reaction process in which solid fines are produced. For example, any suitable olefin or combination of olefins may be used in the stream of olefins 505, for example, those containing from 2 to 16 carbon atoms. The olefins can be polymerized to form homopolymers, copolymers, terpolymers, and the like. In some embodiments, polyethylenes may be prepared. Such polyethylenes include homopolymers of ethylene and copolymers of ethylene and at least one alpha-olefin wherein the ethylene content is at least about 50% by weight of the total monomers involved. Exemplary alpha-olefins that may be utilized are propylene, 1-butene, 1-pentene, 1-hexene, 1-heptene, 1-octene, 4-methyl-1-pentene, 1-decene, 1-dodecene, 1-hexadecene and the like. Also utilizable herein are polyenes such as 1,3-hexadiene, 1,4-hexadiene, 1,5-hexadiene, cyclopentadiene, dicyclopentadiene, 4-vinylcyclohex-1-ene, 1,5-cyclooctadiene, 5-vinylidene-2-norbornene, 5-vinyl-2-norbornene, and olefins formed in situ in the polymerization medium. When olefins are formed in situ in the polymerization medium, the formation of polyethylenes containing long chain branching may occur.

In the present disclosure, any catalyst suitable for polymerizing olefins may be used. For example, an olefin polymerization catalyst may include at least one metal selected from Groups 3, 4, 5, 6, 7, 8, 9, 10, 11, 12 and 13 of the Periodic Table of the Elements. Exemplary metals are titanium, zirconium, hafnium, scandium, vanadium, iron, chromium, nickel and aluminum. The olefin polymerization catalyst may be neutral or cationic.

Examples of such polymerization catalysts include, but are not limited to:

[1] catalyst compounds and compositions containing a Group 6 element, such as chromium, examples of which include but are not limited to the chromium oxide-based catalysts and the organochromium catalysts which may be supported and/or activated;

[2] Ziegler-Natta catalysts and compositions of all types, which typically contain a transition metal component and a co-catalyst such as an organoaluminum compound;

[3] Metallocene catalysts of all types, which is used herein to refer to the substituted and unsubstituted transition metal mono(cyclopentadienyl) and bis(cyclopentadienyl) based catalysts, and analogs of such compounds, such as pentadienyl, pyrrole, boratabenzene, and the like, typically also including an organometallic co-catalyst such as an aluminoxane (such as methyl aluminoxane), alkyl or aryl aluminum compound, or alkyl or aryl substituted boron compound;

[4] Any catalyst compound containing a Group 13 element, such as aluminum containing compounds;

[5] Catalyst compounds and compositions containing a Group 10 element, for example, a nickel containing catalyst such as cationic nickel alkyl diimine complexes, often used in combination with an organometallic co-catalyst;

[6] Catalyst compounds and compositions containing a Group 8 element, such as iron containing compounds, which also optionally may include an organometallic co-catalyst such as an alkylaluminoxane or other organoaluminum or organoboron compound;

[7] Any compound containing a Group 4 element, such as titanium and zirconium containing compounds, examples of which include cationic or neutral titanium and zirconium compounds, and also which may include an organometallic co-catalyst such as an alkylaluminoxane or other organoaluminum or organoboron compound; and

[8] An olefin polymerization catalyst that polymerizes olefins to produce interpolymers of olefins having a molecular weight distribution (MWD) of from 1 to 2.5.

In some embodiments, the above catalysts can be supported on any variety of particulate carriers, as known in the art.

Any suitable polymerization reactor 503 may be used in the present disclosure. For example, the polymerization reactor 503 may be a fluidized bed reactor for polymerizing olefins. Typically, such a fluidized bed reactor includes a reaction zone and a so-called "velocity reduction zone." The reaction zone can include a bed of growing polymer particles, formed polymer particles, and a minor amount of catalyst particles fluidized by a continuous flow of gaseous monomer and diluent (condensate) to remove heat of polymerization from the reaction zone. A suitable rate of gas flow may be readily determined by simple experiment. The velocity-reduction zone (also referred to as a "disengagement chamber") can include an area located above the reaction zone and having a relatively large cross-sectional area, larger than the cross-sectional area of the reaction zone, and with a sufficient height to minimize intensive entrainment of solid particles out of the reaction fluidized bed reactor. In some embodiments, the reaction zone may have an exemplary height-to-diameter ratio of 3-7.5 and the disengagement zone may have an exemplary height-to-diameter ratio of about 1-2. A gas phase reactor 12 having other height-to-diameter ratios for the reaction zone and disengagement zone may be employed. The particular dimensions of the reactor zone and disengagement zone may impact residence time in the fluidized bed reactor.

In accordance with embodiments of the present disclosure, the polymerization in the polymerization reactor 503 can be carried out at a pressure of about 0.5 MPa to about 5 MPa, and at a temperature of from about 30° C. to about 150° C. The gas mixture passing through the fluidized bed polymerization reactor can contain, among the olefin(s) to be polymerized, dienes, hydrogen, and a gas that is inert towards the catalyst such as nitrogen, methane, ethane, n-pentane, iso-pentane, molecules comprising 2, 3, 4, 5, 6, 7, or 8 carbon atoms, and/or propane. In some embodiments of the present disclosure, the gas mixture can pass through the fluidized bed as a rising stream, with a fluidization velocity that is generally between 2 and 8 times the minimum fluidization velocity, e.g., between about 0.2 m/s and about 1.6 m/s. In embodiments of the present invention, fluidization conditions can include, but are not limited to, any of the following regimes: particulate bubbling, slug flow, turbulent, fast fluidization, or pneumatic conveying.

EMBODIMENTS

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments typically are described as "comprising" but, alternatively, can "consist essentially of" or "consist of" unless specifically stated otherwise)

1. An eductor comprising:
   a first tubular body having a hollow interior and comprising
      a first inlet and a first outlet spaced apart from the first inlet along a central axis, and
      a sidewall circumscribing the central axis and defining a mixing chamber; and
   a second tubular body having a hollow interior and comprising a second inlet and a spaced apart second outlet wherein the second tubular body extends into the mixing chamber through the sidewall of the first tubular body between the first inlet and the first outlet,
   wherein the second inlet is oriented substantially perpendicular to the axis of the first tubular body,
   wherein the second tubular body comprises a first bend of less than 90° from perpendicular toward the first outlet before extending into the mixing chamber, and
   wherein the second tubular body comprises a second bend of less than 90° toward the first outlet after extending into the mixing chamber.
2. The eductor of embodiment 1, wherein the second tubular body makes a first bend of about 45° from perpendicular toward the first outlet before entering the mixing chamber and a second bend of about 45° toward the first outlet after entering the mixing chamber.
3. The eductor of embodiment 1, wherein the second tubular body is substantially parallel to the central axis at the second outlet.
4. The eductor of embodiment 1, wherein the first inlet is a solid fines inlet and the second inlet is a motive gas inlet.
5. The eductor of embodiment 4, wherein the second outlet further comprises a nozzle in the mixing chamber.
6. The eductor of embodiment 1, wherein the first inlet is a motive gas inlet and the second inlet is a solid fines inlet.
7. The eductor of embodiment 1, wherein the first tubular body and the second tubular body below the second bend after entering the mixing chamber are coaxial.
8. The eductor of embodiment 1, wherein the first tubular body and the second tubular body below the second bend after entering the mixing chamber are not coaxial.
9. The eductor of embodiment 1, wherein the first tubular body is at least partially cylindrical in shape.
10. The eductor of embodiment 1, wherein the second tubular body is at least partially cylindrical in shape.
11. The eductor of embodiment 1, wherein the first tubular body is at least partially conical in shape.
12. The eductor of embodiment 1, further comprising exit piping downstream of the first outlet which is not parallel with the axis of the first tubular body.
13. The eductor of embodiment 1, further comprising a converging-diverging nozzle adjacent to the first outlet.
14. An eductor comprising:
   a first tubular body having a hollow interior and comprising
      a first inlet and a first outlet spaced apart from the first inlet along a central axis, and
      a sidewall circumscribing the central axis and defining a mixing chamber; and
   a second tubular body having a hollow interior and comprising a second inlet and a spaced apart second outlet, wherein the second tubular body extends into the mixing chamber through the sidewall of the first tubular body between the first inlet and the first outlet, and
   wherein the second tubular body comprises a bend of less than 90° toward the first outlet after extending into the mixing chamber.
15. An eductor comprising:
   a first tubular body having a hollow interior and comprising
      a first inlet and a first outlet spaced apart from the first inlet along a central axis, and
      a sidewall circumscribing the central axis and defining a mixing chamber; and
   a second tubular body having a hollow interior and comprising a second inlet and a spaced apart second outlet, wherein the second tubular body extends into the mixing chamber through the sidewall of the first tubular body between the first inlet and the first outlet,
   wherein the second inlet is oriented at an angle less than perpendicular to the axis of the first tubular body toward the first outlet before extending into the mixing chamber, and
   wherein the second tubular body comprises a bend at an angle less than perpendicular toward the first outlet after extending into the mixing chamber.
16. A method of motivating a gas stream containing solid fines comprising the steps of:
   introducing a gas stream comprising solid fines and a gas stream comprising a motive gas into an eductor, wherein the eductor comprises:
      a first tubular body having a hollow interior and comprising
         a first inlet and a first outlet spaced apart from the first inlet along a central axis, and
         a sidewall circumscribing the central axis and defining a mixing chamber;
      a second tubular body having a hollow interior and comprising a second inlet and a spaced apart second outlet, wherein the second tubular body extends into the mixing chamber through the sidewall of the first tubular body between the first inlet and the first outlet,
      wherein the second inlet is oriented substantially perpendicular to the axis of the first tubular body,
      wherein the second tubular body comprises a first bend of less than 90° from perpendicular toward the first outlet before extending into the mixing chamber, and
      wherein the second tubular body comprises a second bend of less than 90° toward the first outlet after extending into the mixing chamber.
17. The method according to embodiment 16, wherein the second tubular body makes a first bend of about 45° from perpendicular toward the first outlet before extending into the mixing chamber and a second bend of about 45° toward the first outlet after extending into the mixing chamber.
18. The method according to embodiment 16, wherein the first inlet is a solid fines inlet and the second inlet is a motive gas inlet.
19. The method according to embodiment 18, wherein the second outlet further comprises a nozzle in the mixing chamber.
20. The method according to embodiment 16, wherein the first inlet is a motive gas inlet and the second inlet is a solid fines inlet.
21. The method according to embodiment 16, wherein the first tubular body and the second tubular body below the second bend after extending into the mixing chamber are coaxial.
22. The method according to embodiment 16, wherein the first tubular body and the second tubular body below the second bend after extending the mixing chamber are not coaxial.

23. The method according to embodiment 16, wherein one or both of the first tubular body and the second tubular body is at least partially cylindrical in shape.
24. The method according to embodiment 16, wherein the first tubular body is at least partially conical in shape.
25. The method according to embodiment 16, further comprises exit piping downstream of the first outlet of the eductor which is not parallel with the axis of the first tubular body.
26. The method according to embodiment 16, wherein the eductor further comprises a converging-diverging nozzle adjacent to the first outlet.
27. An apparatus for polymerizing olefins, comprising:
    a polymerization reactor for contacting one or more olefins with a catalyst under polymerization conditions to form a gas stream comprising solid fines and unreacted olefins;
    a fines separator in fluid communication with the polymerization reactor for separating the solid fines from the unreacted olefins; and
    an eductor in fluid communication with the fines separator for conveying the solid fines back to the polymerization reactor, wherein the eductor comprises:
    a first tubular body having a hollow interior and comprising
        a first inlet and a first outlet spaced apart from the first inlet along a central axis, and
        a sidewall circumscribing the central axis and defining a mixing chamber; and
    a second tubular body having a hollow interior and comprising a second inlet and a spaced apart second outlet, wherein the second tubular body extends into the mixing chamber through the sidewall of the first tubular body between the first inlet and the first outlet,
    wherein the second inlet is oriented substantially perpendicular to the axis of the first tubular body,
    wherein the second tubular body comprises a first bend of less than 90° from perpendicular toward the first outlet before extending into the mixing chamber, and
    wherein the second tubular body comprises a second bend of less than 90° toward the first outlet after extending into the mixing chamber.
28. The apparatus of embodiment 27, further comprising a heat exchanger for cooling the unreacted olefins from the fines separator, a compressor for compressing the cooled unreacted olefins, and a conduit for recycling the cooled and compressed unreacted olefins back to the polymerization reactor.
29. The apparatus of embodiment 27, wherein the gas stream further comprises an inert hydrocarbon.
30. The apparatus of embodiment 27, further comprising a conduit for conveying at least a portion of the cooled and compressed unreacted olefins as a motive gas to the first inlet or the second inlet of the eductor.
31. The apparatus of embodiment 27, wherein the first inlet is a solid fines inlet and the second inlet is a motive gas inlet.
32. The apparatus of embodiment 31, wherein the second outlet further comprises a nozzle in the mixing chamber.
33. The apparatus of embodiment 27, wherein the first inlet is a motive gas inlet and the second inlet is a solid fines inlet.
34. The apparatus of embodiment 27, wherein the first tubular body and the second tubular body below the second bend after entering the mixing chamber are coaxial.
35. The apparatus of embodiment 27, wherein the first tubular body and the second tubular body below the second bend after entering the mixing chamber are not coaxial.
36. The apparatus of embodiment 27, wherein one or both of the first tubular body and the second tubular body is at least partially cylindrical in shape.
37. The apparatus of embodiment 27, wherein the first tubular body is at least partially conical in shape.
38. The apparatus of embodiment 27, wherein the eductor further comprises a converging-diverging nozzle adjacent to the first outlet.
39. A process for polymerizing olefins comprising:
    contacting one or more olefins with a catalyst in a polymerization reactor under polymerization conditions to form a gas stream comprising fine polymer particles and unreacted olefins;
    passing the gas stream to a fines separator to separate the fine polymer particles from the unreacted olefins;
    passing the fine polymer particles from the fines separator to the eductor of embodiment 1; and
    introducing a motive gas into the eductor to convey the fine polymer particles back to the polymerization reactor.
40. The process of embodiment 39, further comprising passing the unreacted olefins from the fines separator to a heat exchanger to cool the unreacted olefins, passing the cooled unreacted olefins to a compressor to compress the cooled unreacted olefins, and introducing the cooled and compressed unreacted olefins back to the polymerization reactor.
41. The process of embodiment 39, wherein the motive gas comprises at least a portion of the cooled and compressed unreacted olefins.
42. The process of embodiment 39, wherein the first inlet is a solid fines inlet and the second inlet is a motive gas inlet.
43. The process of embodiment 42, wherein the second outlet further comprises a nozzle in the mixing chamber.
44. The process of embodiment 39, wherein the first inlet is a motive gas inlet and the second inlet is a solid fines inlet.
45. The process of embodiment 39, wherein the first tubular body and the second tubular body below the second bend after entering the mixing chamber are coaxial.
46. The process of embodiment 39, wherein the first tubular body and the second tubular body below the second bend after entering the mixing chamber are not coaxial.
47. The process of embodiment 39, wherein one or both of the first tubular body and the second tubular body is at least partially cylindrical in shape.
48. The process of embodiment 39, wherein the first tubular body is at least partially conical in shape.
49. The process of embodiment 39, wherein the eductor further comprises a converging-diverging nozzle adjacent to the first outlet.

What is claimed is:
1. An eductor comprising:
    a first tubular body having a hollow interior comprising:
        a first inlet and a first outlet spaced apart from the first inlet along a central axis, and
        a sidewall circumscribing the central axis and defining a mixing chamber; and
    a second tubular body having a hollow interior and comprising a second inlet and a spaced apart second outlet, wherein the second tubular body extends into the mixing chamber through the sidewall of the first tubular body between the first inlet and the first outlet, wherein the second tubular body comprises a bend of less than 90° toward the first outlet after extending into the mixing chamber.

2. The eductor of claim 1, wherein the second tubular body makes a first bend of about 45° from perpendicular toward the first outlet before entering the mixing chamber and a second bend of about 45° toward the first outlet after entering the mixing chamber.

3. The eductor of claim 1, wherein the second tubular body is substantially parallel to the central axis at the second outlet.

4. The eductor of claim 1, wherein the first inlet is a solid fines inlet and the second inlet is a motive gas inlet.

5. The eductor of claim 4, wherein the second outlet further comprises a nozzle in the mixing chamber.

6. The eductor of claim 1, wherein the first inlet is a motive gas inlet and the second inlet is a solid fines inlet.

7. The eductor of claim 1, wherein the first tubular body and the second tubular body below the second bend after entering the mixing chamber are coaxial.

8. The eductor of claim 1, wherein the first tubular body is at least partially cylindrical in shape.

9. The eductor of claim 1, wherein the second tubular body is at least partially cylindrical in shape.

10. The eductor of claim 1, wherein the first tubular body is at least partially conical in shape.

11. The eductor of claim 1, further comprising exit piping downstream of the first outlet which is not parallel with the axis of the first tubular body.

12. The eductor of claim 1, further comprising a converging-diverging nozzle adjacent to the first outlet.

13. An eductor comprising:
a first tubular body having a hollow interior and comprising:
   a first inlet and a first outlet spaced apart from the first inlet along a central axis, and
   a sidewall circumscribing the central axis and defining a mixing chamber; and
a second tubular body having a hollow interior and comprising a second inlet and a spaced apart second outlet,
wherein the second tubular body extends into the mixing chamber through the sidewall of the first tubular body between the first inlet and the first outlet,
wherein the second inlet is oriented at an angle less than perpendicular to the axis of the first tubular body toward the first outlet before extending into the mixing chamber, and
wherein the second tubular body comprises a bend at an angle less than perpendicular toward the first outlet after extending into the mixing chamber.

14. The eductor of claim 13, wherein the second tubular body makes a first bend of about 45° from perpendicular toward the first outlet before entering the mixing chamber and a second bend of about 45° toward the first outlet after entering the mixing chamber.

15. A process for polymerizing olefins comprising:
contacting one or more olefins with a catalyst in a polymerization reactor under polymerization conditions to form a gas stream comprising fine polymer particles and unreacted olefins;
passing the gas stream to a fines separator to separate the fine polymer particles from the unreacted olefins;
passing the fine polymer particles from the fines separator to the eductor of claim 1; and
introducing a motive gas into the eductor to convey the fine polymer particles back to the polymerization reactor.

16. The process of claim 15, further comprising passing the unreacted olefins from the fines separator to a heat exchanger to cool the unreacted olefins, passing the cooled unreacted olefins to a compressor to compress the cooled unreacted olefins, and introducing the cooled and compressed unreacted olefins back to the polymerization reactor.

17. The process of claim 16, wherein the motive gas comprises at least a portion of the cooled and compressed unreacted olefins.

18. A process for polymerizing olefins comprising:
contacting one or more olefins with a catalyst in a polymerization reactor under polymerization conditions to form a gas stream comprising fine polymer particles and unreacted olefins;
passing the gas stream to a fines separator to separate the fine polymer particles from the unreacted olefins;
passing the fine polymer particles from the fines separator to the eductor of claim 13; and
introducing a motive gas into the eductor to convey the fine polymer particles back to the polymerization reactor.

19. The process of claim 18, further comprising passing the unreacted olefins from the fines separator to a heat exchanger to cool the unreacted olefins, passing the cooled unreacted olefins to a compressor to compress the cooled unreacted olefins, and introducing the cooled and compressed unreacted olefins back to the polymerization reactor.

20. The process of claim 19, wherein the motive gas comprises at least a portion of the cooled and compressed unreacted olefins.

* * * * *